United States Patent [19]
Jagielski et al.

[11] Patent Number: 5,140,374
[45] Date of Patent: Aug. 18, 1992

[54] READER PRINTER

[75] Inventors: David Jagielski, West Bend; Wojciech Dabrowski, Milwaukee; Paul Hanke, Leroy, all of Wis.

[73] Assignee: Anacomp Corporation, Indianapolis, Ind.

[21] Appl. No.: 776,841

[22] Filed: Oct. 15, 1991

[51] Int. Cl.$^5$ .......................................... G03G 21/00
[52] U.S. Cl. ................................. 355/271; 355/45
[58] Field of Search ............... 355/271, 233, 235, 43, 355/44, 66, 60, 45; 353/21

[56] References Cited

U.S. PATENT DOCUMENTS

| | | | |
|---|---|---|---|
| 4,411,513 | 10/1983 | James | 355/271 |
| 4,494,859 | 1/1985 | Frias et al. | 355/271 |
| 4,593,996 | 6/1986 | Kubono | 355/271 |
| 4,648,707 | 3/1987 | Tanasescu | 355/45 |
| 4,738,523 | 4/1988 | Ito et al. | 355/45 X |
| 4,751,553 | 6/1988 | Fukasawa | 355/45 |
| 4,783,685 | 11/1988 | Kahle | 355/271 X |
| 4,873,552 | 10/1989 | Otsuki | 355/271 |
| 4,967,235 | 10/1990 | Sanbayashi | 355/271 |

FOREIGN PATENT DOCUMENTS

| | | | |
|---|---|---|---|
| 62-242927 | 10/1987 | Japan | 355/271 |
| 63-121038 | 5/1988 | Japan | 355/271 |
| 63-249139 | 10/1988 | Japan | 355/271 |
| 1-161332 | 6/1989 | Japan | 355/271 |
| 1-172846 | 7/1989 | Japan | 355/271 |

Primary Examiner—R. L. Moses
Attorney, Agent, or Firm—Mason, Kolehmainen, Rathburn, & Wyss

[57] ABSTRACT

A reader printer apparatus includes a modular housing formed by structural foam molding which includes an integrally formed means for carrying the various components of a reader printer apparatus. By providing an integrally formed carrying means, the need for a separate metal chassis and brackets is eliminated, thus reducing the number of parts required. Additionally, this allows the weight of the machine to be reduced to a value less than the seventy pound limit to enable the machine to be shipped by relatively less expensive small package carriers. The reader printer apparatus in accordance with the present invention includes a scanning assembly located relatively close to the object plane in order to reduce the overall size of the machine. Moreover, by locating adjacent scanning assembly adjacent to the object plane, the optical paths for the printing mode and the viewing mode are virtually independent, thus obviating the need for pivotally mounted viewing mirrors. The scanning assembly includes a pivotally mounted print mirror driven by a stepper motor synchronized to the speed of the print engine by a stepper motor, mechanically independent from the print engine. This reduces distortions in prints due to wear and voltage fluctuations relative to the print engine.

29 Claims, 10 Drawing Sheets

READER PRINTER

BACKGROUND OF THE INVENTION

1. Field of the Invention

This invention generally relates to a reader printer apparatus and more particularly to a reader printer apparatus for viewing microimages and alternatively printing microimages on standard 8½×11 plain paper which includes a molded modular housing which allows components to be secured directly thereto, thereby obviating the need for various metal chassis and brackets which significantly reduces the overall weight of the machine and a scanning mechanism that is synchronized to the speed of the print engine but, mechanically independent from the print engine in order to reduce distortions in recorded images due to speed fluctuations in the print engine motor due to wear or voltage fluctuations.

2. Description of the Prior Art

Various reader printer apparatus are known in the art. An example of such an apparatus is disclosed in U.S. Pat. No. 4,783,685. Such apparatus are utilized for displaying and printing microimages formed on microfilm, microfiche and the like. Such apparatus normally include an injection molded outer housing formed from an injection molded plastic material. Since such a process can only yield wall thicknesses that are approximately one hundred thousandths inches thick, the housings formed from such a process do not have the structural integrity to support the various components within the apparatus. Consequently, such reader printer apparatus are generally provided with various metal chassis and brackets, rigidly secured within the injection molded housing for carrying the various components within the reader printer apparatus. Such metal chassis and brackets add considerable weight to the machine, which, in turn, can lead to a relatively heavier apparatus, which is not only more cumbersome to handle but results in increased cost due to the additional components. In addition, such apparatus result in increased shipping costs. More specifically, such machines which utilize various metal chassis and brackets typically weigh about one hundred pounds. It is generally well known that shipping articles that weigh more than seventy pounds often have to be shipped by truck, which can be relatively expensive. On the other hand, articles which weigh less than seventy pounds can be shipped by small package carriers, such as United Parcel Service, at a substantially lower cost.

Another problem with reader printer apparatus as described in the aforementioned U.S. patent relates to the scanning mechanism. More specifically, such an apparatus utilizes a slit exposure type image recording method for printing the microimage. In a slit exposure type printing apparatus, the image is formed on a printing drum in sections by scanning consecutive portions of the microimage. The image is scanned by a scanning mechanism which includes a print mirror that is rotated during a print cycle to consecutively form the image on the print drum. In such a system, the rotatable print mirror is mechanically driven from the print drum in order to synchronize the scanning speed with the speed of the print drum.

As is known in the art, the scanning speed of the scanning box mechanism must be kept relatively constant. However, due to wear on the print engine, the scan box mechanism does not always run at a constant speed over the life of the engine. Moreover, gear runout in the engine drive mechanism is not the same for each engine. Consequently, runout over the life of the engine can cause erratic movement of the scan box mechanism when scanning. Since the scanning mechanism is mechanically driven from the print engine, such variations in the engine drive mechanism can result in recorded images that are out of focus.

There are other problems associated with the reader printer apparatus as disclosed in the aforementioned U.S. patent. These problems relate to the position of the scanning mechanism relative to the object plane (e.g., the plane defined by the microfiche after it is inserted into the machine for viewing or printing). In the reader printer apparatus disclosed in the aforementioned U.S. patent, the scanning mechanism is disposed about half way between the object plane and the image plane (e.g., the plane defined by the printed image, for example, on the print drum). By disposing the scanning mechanism midway between the object plane and the image plane, the overall length of the machine is increased. Moreover, in such an apparatus, the optical paths during a viewing mode and a printing mode overlap which results in the need to provide movably mounted viewing mirrors that are moved out of the optical path during a printing mode.

SUMMARY OF THE INVENTION

It is an object of the present invention to solve the problems associated with the prior art.

It is another object of the present invention to provide a reduced weight reader printer apparatus.

It is another object of the present invention to provide a relatively smaller reader printer apparatus.

It is another object of the present invention to reduce the shipping costs for reader printer apparatus.

It is yet a further object of the present invention to improve the scan mechanism for a slit exposure type printing apparatus.

It is yet a further object of the present invention to provide a scanning mechanism which is mechanically independent from the print engine.

It is yet another object of the present invention to reduce the need for movably mounted viewing mirrors in a reader printer apparatus.

It is yet a further object of the present invention to provide non-overlapping optical paths for printing and viewing.

Briefly, the present invention relates to a reader printer apparatus which includes a modular housing formed by structural foam molding which includes integrally formed means for carrying the various components of the reader printer apparatus. By providing integrally formed carrying means, the need for various metal chassis and brackets is eliminated, thus reducing the number of parts required. Additionally, such a housing allows the weight of the machine to be reduced to a value less than the seventy pound limit to enable the machine to be shipped by relatively less expensive small package carriers. The reader printer apparatus in accordance with the present invention further includes a scanning assembly, disposed adjacent the object plane in order to reduce the overall length of the machine. Moreover, by locating the scanning assembly adjacent the object plane, the optical paths for the printing mode and viewing mode are independent, thus obviating the need for movably mounted viewing mirrors. The scanning assembly includes a pivotally mounted printing mirror, synchronized to the speed of the print engine by a stepper motor, mechanically independent from the print engine. This reduces distortions in recorded images due to engine drive mechanism wear and gear runout.

DESCRIPTION OF THE DRAWING

These and other objects and features of the present invention will become better understood from the following description with reference to the accompanying drawing, in which.

DETAILED DESCRIPTION

The present invention relates to an apparatus for viewing and printing microimages recorded on various microforms, such as microfilm, microfiche, aperture cards, and the like. Although the present invention will be described in terms of microfiche, it will be clear to those of ordinary skill in the art that the principles of the invention are not limited by the specific microform used.

Figure 1:
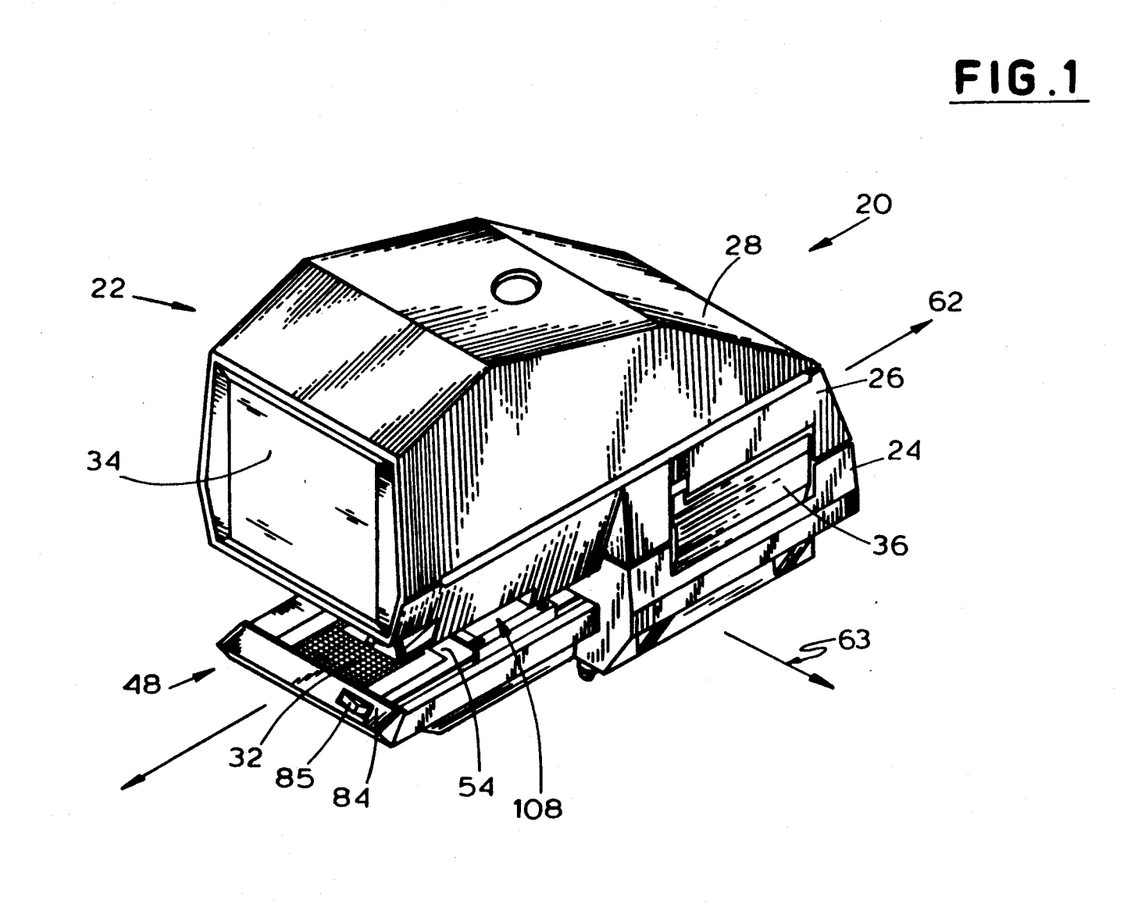
FIG. 1 is a perspective view of the reader printer apparatus in accordance with the present invention.

The microfiche reader printer apparatus in accordance with the present invention is generally identified with the reference numeral 20. Referring to the drawing and in particular to FIG. 1, the reader printer apparatus 20 includes a housing 22 which includes a base section 24, a central section 26 and a top section 28. As will be discussed in more detail below, a microfiche carriage assembly 30 (FIG. 3) is carried by the housing 22 to enable each frame on the microfiche to be positioned relative to the optical path as will be discussed below. In order to facilitate location of a particular frame on the microfiche, a locating grid 32 may be provided. The locating grid 32 in conjunction with a pointer (not shown), formed on the microfiche carriage assembly 30, enables relative quick and convenient location of a particular frame on the microfiche.

During a viewing mode, the selected frame on the microfiche is displayed on a viewing screen 34 located in the front of the reader printer apparatus 20. In a print mode, the selected frame is printed on plain paper, discharged from a paper discharge slot 36 formed on one side of the machine. The paper is fed into the apparatus by way of a paper intake slot (not shown) formed on the opposite side of the machine 20.

Figure 3:
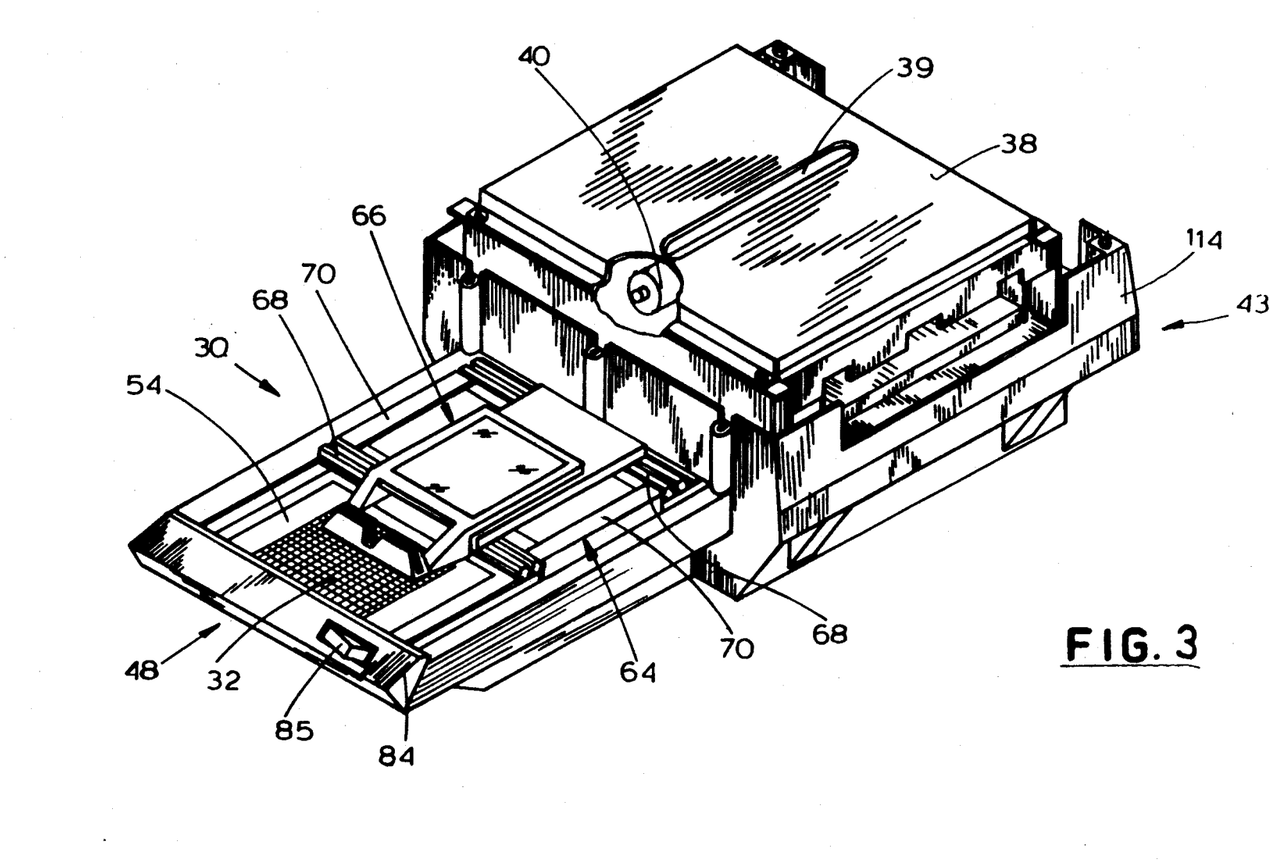
FIG. 3 is a perspective view of the lower portion of the reader printer apparatus partially broken away illustrating the base section of the housing as well as the print engine and the microfiche carriage assembly in accordance with the present invention.
Figure 9:
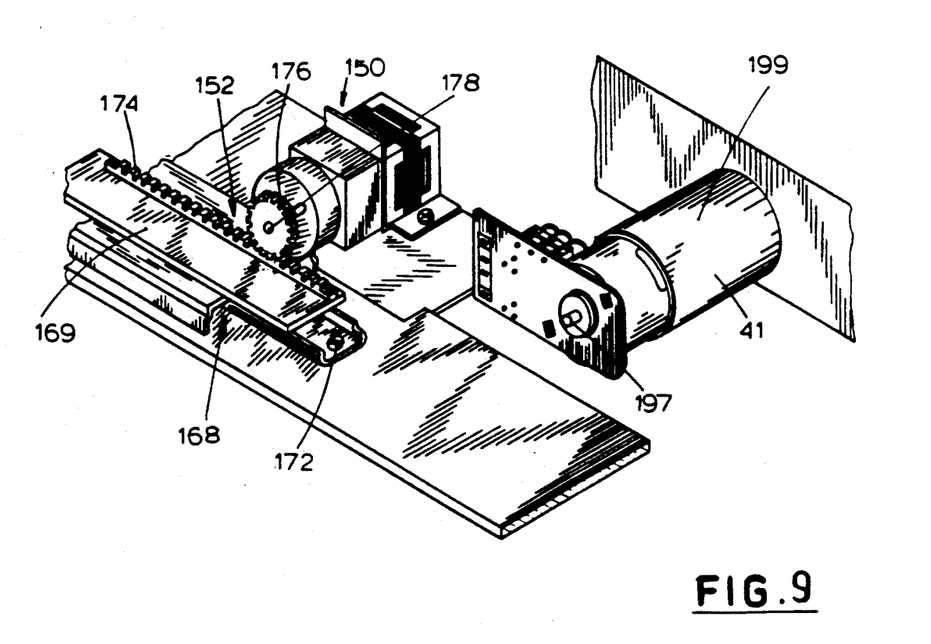
FIG. 9 is a perspective view of the carrier assembly which carries the scanning assembly which also illustrates the print engine motor as well as the stepper motor and rack and pinion assembly for driving the carrier assembly in accordance with the present invention.

As best illustrated in FIG. 3, the base 24 carries an electrophotographic image recording system 38, commonly known as a print engine, in a rear portion of the housing 22. Print engines are relatively well known in the art and are disclosed in detail in U.S. Pat. No(s). 3,709,603 and 4,129,373 which are hereby incorporated by reference. Such systems are also available as modular units as shown in FIG. 3; for example, a Sanyo Model No. SFT-50. Such print engines 38 include a photoconductive drum 40 (FIG. 3), driven by a print engine motor 41 (FIG. 9). In operation, the image from the microfiche is projected in sections onto the photo-conductive drum 40 by way of various mirrors through a slot 39 (FIG. 3), disposed above the drum 40. The image formed on the photoconductive drum 40 is then coated with a toner from a developer. The toner is then transferred to recording paper and fused thereonto by way of heated fusion rollers or passed under a radiant heater to form a permanent image on the recording paper when cooled.

MODULAR HOUSING

An important aspect of the invention relates to the modular housing 22, formed by structural foam molding, which includes an integrally formed means for carrying the various components of the reader printer apparatus. By providing a housing with integrally formed carrying means, the need for various separate metal chassis and brackets is eliminated, thus reducing the overall weight of the reader printer apparatus 20 as well as the cost.

Known reader printer apparatus, such as the apparatus disclosed in U.S. Pat. No. 4,783,685, formed from high impact styrene utilizing a conventional injection molding process, yields wall thicknesses of about one hundred thousandths inches, generally unsuitable for carrying various components within the reader printer apparatus, particularly moving parts. Thus, in such known apparatus, various metal chassis and brackets are rigidly secured to the housing for carrying various components in the reader printer apparatus. Such metal chassis and brackets generally increase the weight of the machine resulting in a weight of about 100 pounds, for example.

The housing 22 for the reader printer apparatus 20 in accordance with the present invention is formed from three modular sections defining a base section 24, a central section 26 and a top section 28 adapted to be fit together to form the housing 22 as shown. Each of the above-mentioned sections 24, 26 and 28 is formed from high impact styrene utilizing a structural foam process. Such a structural foam process is known in the art but has heretofore not been known to be utilized for reader printer apparatus. By utilizing a structural foam process, minimum wall thicknesses of one quarter inch can be formed which can be varied up to one half inch. Thus, various components can be mounted directly to the housing 22, thus eliminating the need for various metal chassis and brackets as in known reader printer apparatus whose housings are formed by an injection molding process. Accordingly, the weight of the reader printer apparatus 20 in accordance with the present invention will be greatly reduced, for example, to 70 pounds or less.

The print engine 38 may be secured to the base section 24 of the housing 22 without the need for a separate metal chassis. More specifically, with reference to FIG. 2, a rear portion 43 of the molded base section 24 is provided with a pair of integrally molded front stand-offs 42 and a pair of integrally molded rear stand-offs 44. Each of the standoffs 42 and 44 are provided with threaded insert bosses 46. These bosses 46 are adapted to secure the engine mounting plates (not shown), for example, by way of a plurality of fasteners (not shown) to enable the print engine 38 to be secured to the stand-offs 42 and 44. Since the print engine 38 is adapted to be connected directly to the base section 24, the need for a metal chassis for the print engine 38 is thus obviated.

Figure 4:
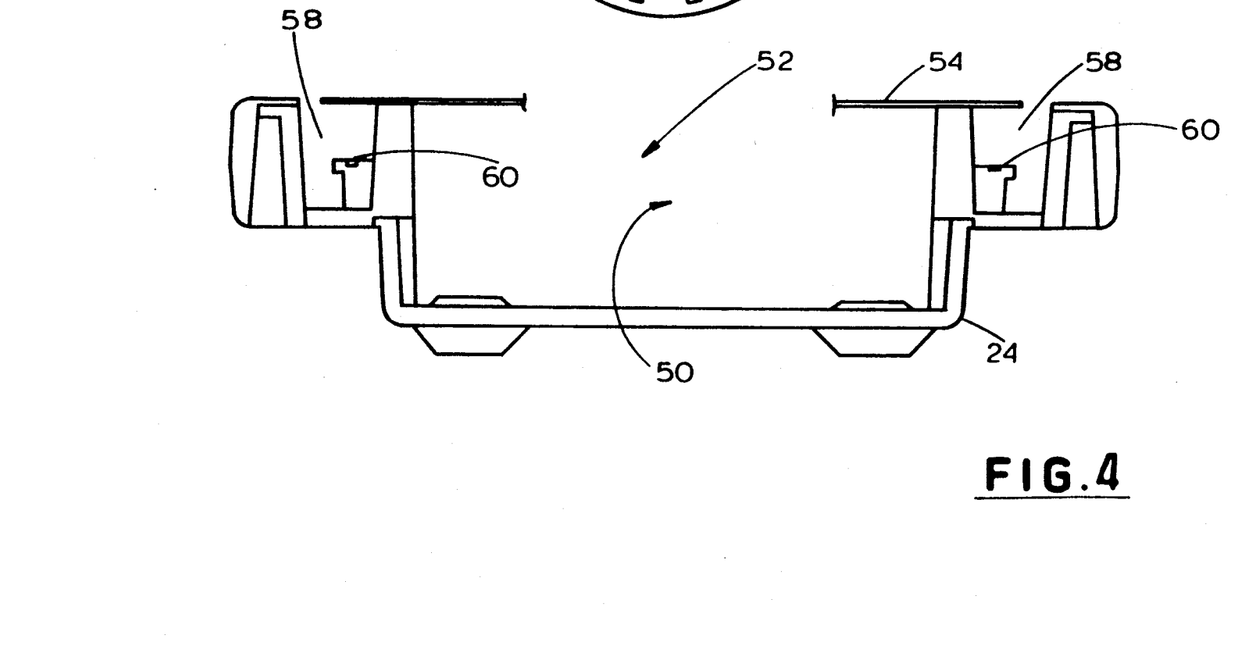
FIG. 4 is an elevational view of the front portion of the base section of the housing with a cover partially broken away in accordance with the present invention.

As best shown in FIG. 4, a front portion 48 of the base section 24 is molded to provide an opening 50 in the front as well as an opening 52 on top. A cover 54 is used to close the top. The cover 54 may be rigidly secured to the base section 24 with suitable fasteners as heretofore described. The locating grid 32 may be printed on the cover 54 or provided on a separate material and attached to the cover 54. The cover 54 is provided with an aperture 56 (FIG. 2) to allow the light path to be projected relatively perpendicular to the object plane.

Generally U-shaped elongated notches 58 (FIG. 4) are provided on opposing ends of the front portion 48 of the base section 24. Track members 60 are formed within the notches 58. The track members 60 provide rolling support for the microfiche carriage assembly 30 to enable the microfiche carriage assembly 30 to be movably mounted along an axis generally parallel to a longitudinal axis 62 relative to the aperture 56 in the cover 54 to enable individual frames on the microfiche to be aligned with the optical path. Microfiche carried by the microfiche carriage assembly 30 is also movably mounted about axes generally parallel to a transverse axis 63 as will be discussed below.

The microfiche carriage assembly 30 includes a base subassembly 64 and a carrier subassembly 66 (FIG. 3). The base subassembly 64 includes a pair of spaced apart rails 68 oriented generally transverse to the track members 60, which allow for transverse movement of the carrier subassembly 66. Connecting members 70 are rigidly secured between the rails 68 on opposing ends to form a frame-like structure. The connecting members 70 are formed as generally C-shaped members, adapted to ride on the track members 60 to allow movement longitudinal of the microfiche carriage assembly 30. The carrier assembly 66 is formed as a generally rectangular frame for carrying a microfiche, movably mounted relative to rails 68 to allow transverse movement of the microfiche relative to the aperture 56 in cover 54.

Figure 2:
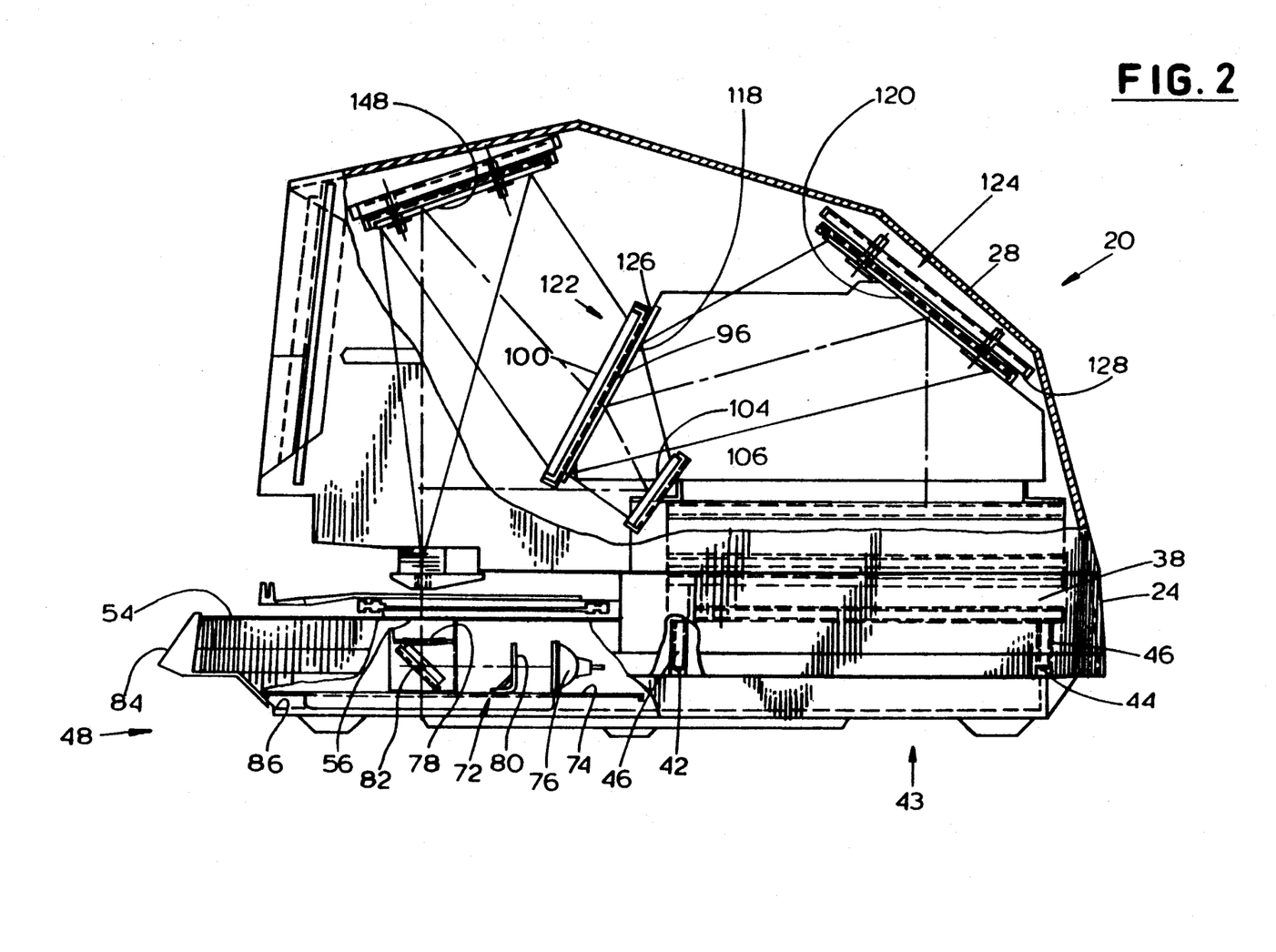
FIG. 2 is an elevational view partially broken away of the reader printer apparatus illustrated in FIG. 1.

A condensing optical subassembly 72 (FIG. 2) is adapted to be received in the opening 50 defined between the elongated notches 58 in the front portion 48 of the base section 24. The condensing optical subassembly 72 allows a light beam to be concentrated through a frame on the microfiche by way of the aperture 56 in the cover 54. The condensing optical subassembly 72 includes a carrier 74, a lamp 76, condensing lenses 78 and 80 and a mirror 82. As best shown in FIG. 2, the condensing lens 78 is disposed to be generally aligned with the aperture 56 in the cover 54. The lamp 76 as well as the condensing lens 78 are rigidly mounted to the carrier 74 along an axis generally parallel to the longitudinal axis 62. The mirror 82 is positioned to change the angle of the light path to reflect the light through the condensing lens 78 mounted adjacent the aperture 56.

A cover 84 is rigidly secured to the front portion of the carrier 74. The cover 84 is adapted to close the opening 50 in the front portion 48 of the base section 24 including the notches 58. A selector switch 85 may be provided on the cover 84.

As best shown in FIG. 2, the carrier 74 is adapted to rest on a floor 86 in the front portion 48 of the base section 24. A latch assembly (not shown) may be provided to latch the cover 84 to the cover 54 to secure the condensing optical system subassembly 72 relative to the front portion 48 of the base section 24.

Figure 5:
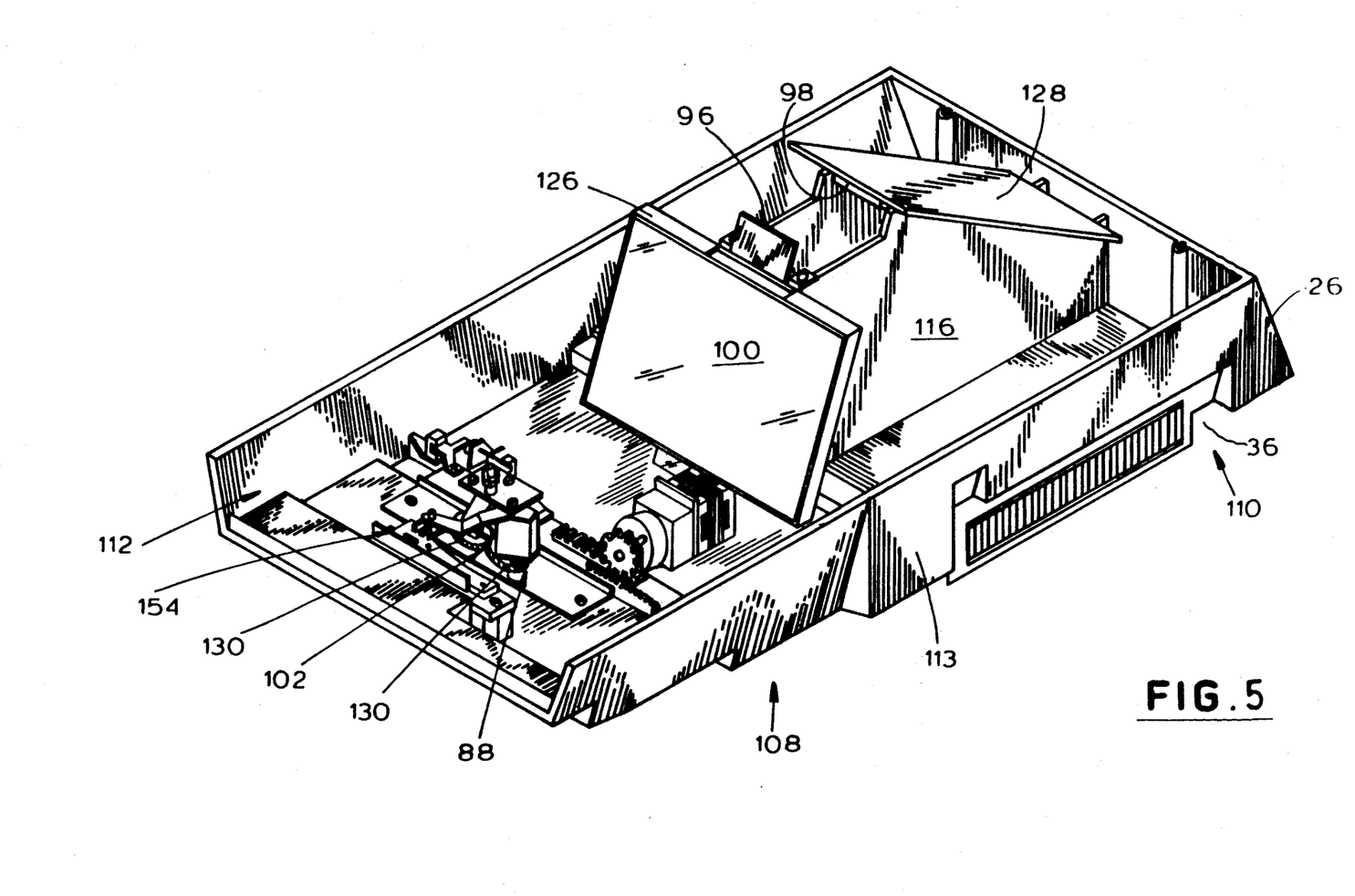
FIG. 5 is a perspective view of a central section of the housing which illustrates various components mounted thereto including the scanning assembly in accordance with the present invention.
Figure 7:
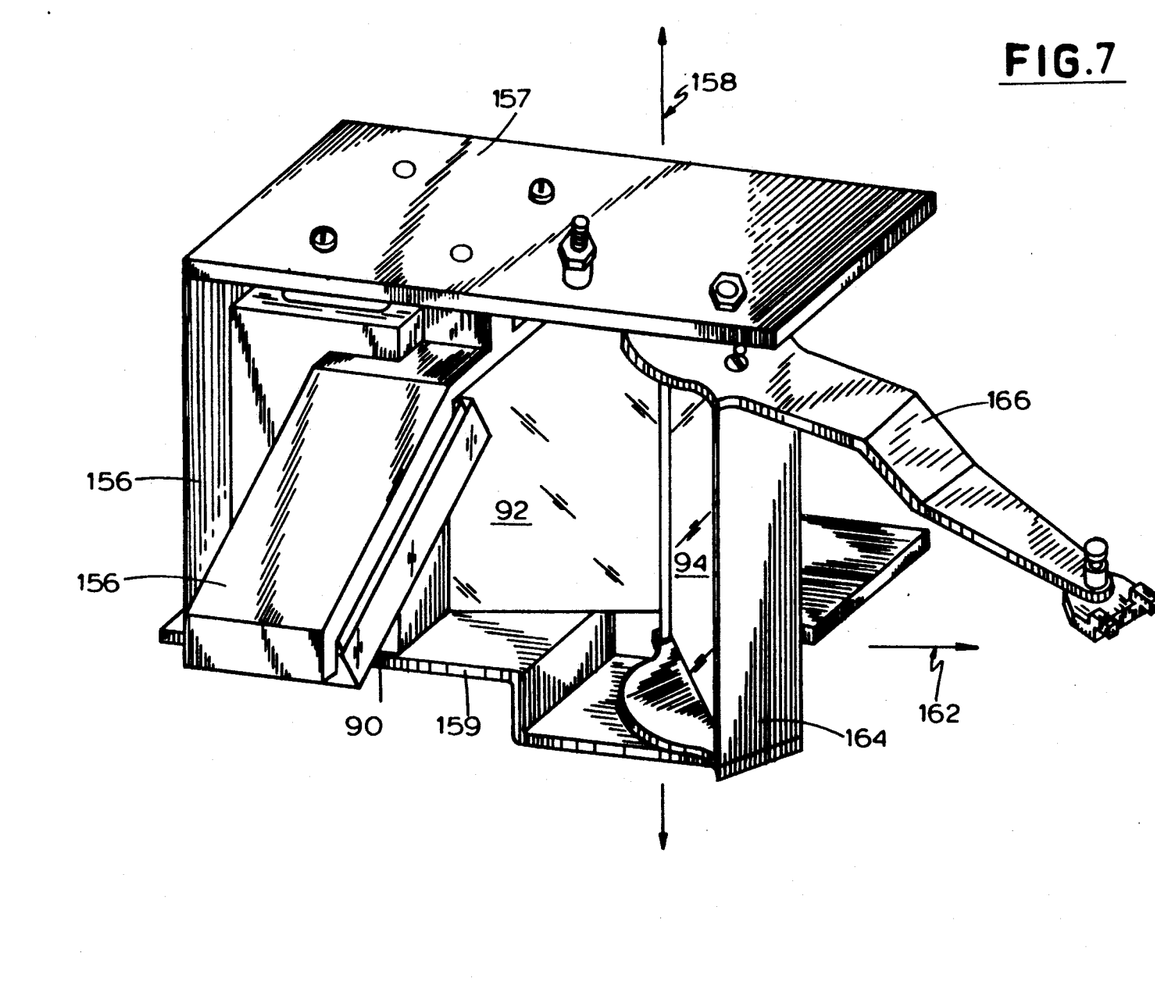
FIG. 7 is a perspective view of the scanning assembly in accordance with the present invention.

The central section 26 of the housing 22 is illustrated best in FIG. 5. The central section 26 is used to carry a scanning assembly 88 as well as various other components as will be discussed below. More specifically, a total of six mirrors are utilized to form the optical path in the printing mode while two mirrors are utilized for the viewing mode. As will be discussed in more detail below, the scanning assembly 88 contains a first print mirror 90, a second print mirror 92 and a third print mirror 94 (FIG. 7). The central section 24 of the housing in addition to carrying the scanning assembly 88 carries a fifth print mirror 96, a sixth print mirror 98, a second viewing mirror 100 and an objective lens assembly 102. A fourth print mirror 104 is mounted on a bracket 106 which may be secured to the print engine housing 38 as shown in FIG. 2.

The central section 26 is formed as an elongated tray. As best shown in FIGS. 1 and 2, a front portion 108 of the central section 26 is adapted to extend over the cover 54 secured to the base section 24. A mouth 112 (FIG. 5) is formed in the front portion 108, which, in conjunction with the top section 28, is adapted to carry the viewing screen 34. A rear portion 110 of the central section 26 is formed with sidewalls 113 adapted to be aligned with sidewalls 114 (FIG. 3), formed in the rear portion 43 of the base section 24.

The central section 24 is formed with a pair of integrally molded spaced apart side plates 116 (FIG. 5). The side plates 116 are formed with sloped surfaces 118 and 120 (FIG. 2), adapted to carry mirror assemblies 122 and 124. The mirror assembly 122 includes a bracket 126 which carries the second viewing mirror 100 and the fifth printing mirror 96. More specifically, the viewing mirror 100 is rigidly secured relative to one side of the bracket 126. The fifth print mirror 96 is rigidly secured to the opposite side of the bracket 126 to form the mirror assembly 122. The bracket 126 is in turn rigidly secured to the sloped surface 118 of the side plates 116.

The mirror assembly 124 carries the sixth print mirror 98. More specifically, the mirror assembly 124 includes a bracket 128. The sixth print mirror 98 is secured to one side of the bracket 128. The bracket 128 is, in turn, rigidly secured to the sloped surfaces 120 on the spaced apart side plates 116.

The front portion 108 of the central section 24 carries the scanning assembly 88 as well as the objective lens assembly 102. The scanning assembly 88 will be discussed in detail below. The objective lens assembly 102 includes a pair of objective lenses 130 mounted side by side on a slidably mounted plate in a known manner to enable one or the other of the objective lens 130 to be aligned with the aperture 56 in the cover 54. Each of the objective lenses 130 provides a different magnification of the microimage on the microfiche. A selector knob (not shown) may be provided on the front of the machine 20 to allow the objective lenses 130 to be manually selected.

Figure 6:
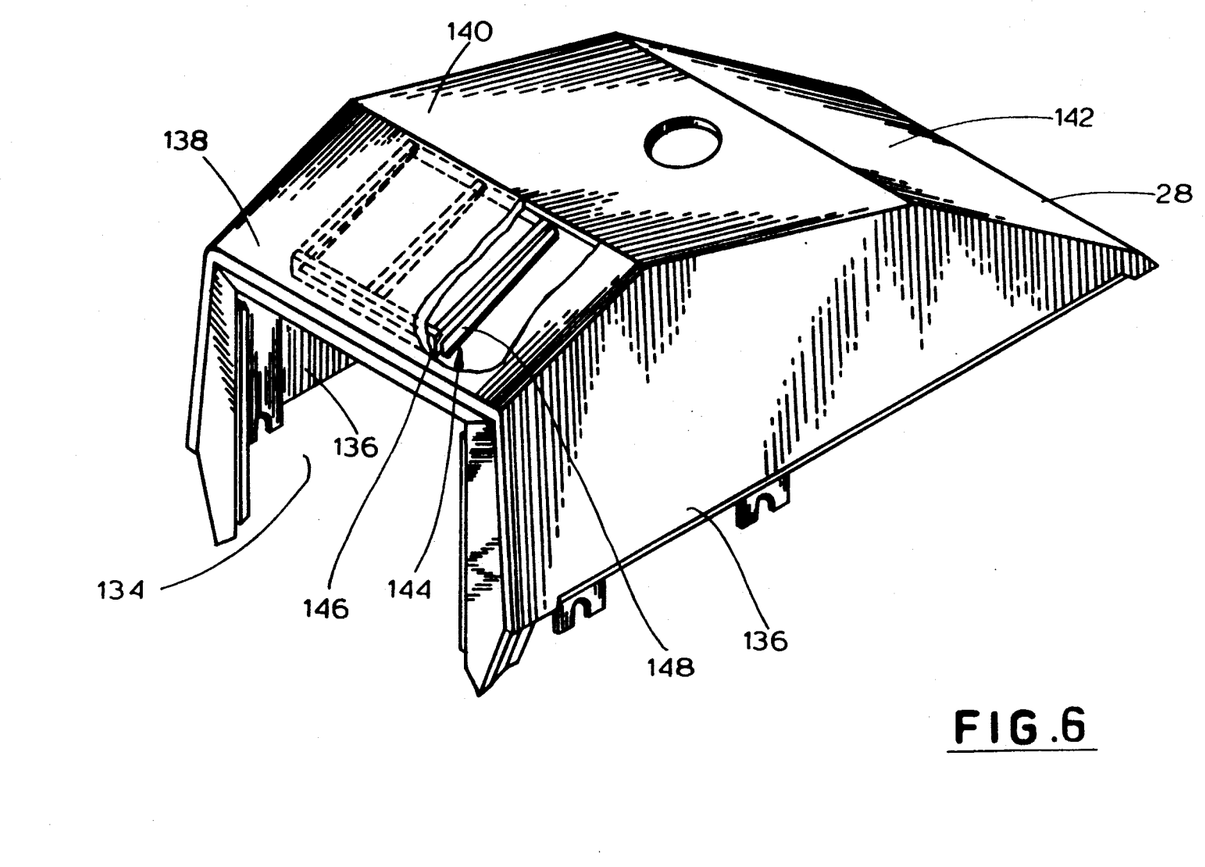
FIG. 6 is a perspective view of the top section of the housing partially broken away to illustrate a viewing mirror assembly mounted thereto in accordance with the present invention.

The top section 28 of the housing 22 is best illustrated in FIG. 6. A mouth portion 134 is formed in the top section 28, which in conjunction with the mouth portion 112 on the center section 26 is adapted to carry the viewing screen 34. The mouth portion 134 is formed between two spaced apart sidewall portions 136. The sidewall portions 136 are adapted to be aligned with the sidewall portions 113 in the center section 26. Integrally molded members 138, 140 and 142 are used to interconnect the spaced apart sidewalls portions 136

A mirror assembly 144 is rigidly secured to the interconnecting member 138. The mirror assembly 144 includes a bracket 146, adapted to be rigidly secured to the interconnecting member 138. The bracket 146 carries a first viewing mirror 148.

SCANNING ASSEMBLY

Another important aspect of the invention relates to the scanning assembly 88. The scanning assembly 88 in conjunction with a stepper motor 150, a rack and pinion subassembly 152 (FIG. 9) and a cam bar assembly 154 (FIG. 8) allows a microimage to be scanned in sections that are consecutively transferred to the photoconductive drum 40 on the print engine 38 by way of the slot 39 (FIG. 3).

The scanning assembly 88 in accordance with the present invention offers several advantages over scanning systems in known reader printer apparatus, such as disclosed in U.S. Pat. No. 4,783,685. First, the location of the scanning assembly 88 relative to the object plane (e.g. microfiche) is optimized. More specifically, the scanning assembly 88 is disposed adjacent the objective lenses 130 as best shown in FIG. 5. By locating the scanning assembly 88 adjacent the objective lenses 130, the overall length of the machine 20 is reduced. In the reader printer apparatus, disclosed in the aforementioned U.S. patent, the scanning assembly is disposed midway between the object plane and the image plane (e.g. photoconductive drum), thereby increasing the overall length of the machine.

The location of scanning assembly 88 further obviates the need for movably mounted viewing mirrors as in the machine disclosed in the aforementioned U.S. patent. More specifically, in the machine disclosed in the aforementioned patent, the viewing made optical path and in particular, a viewing mirror interferes with the printing mode optical path. As such the viewing mirror in such a machine is pivotally mounted and forced to swing out of the way during a printing mode by way of a motor and mechanical linkage which adds additional cost and weight to the machine. With the scanning assembly 88 in accordance with the present invention, the need for pivotally mounted viewing mirrors is obviated. More specifically, during a viewing mode the scanning assembly 88 is normally disposed adjacent the objective lenses 130 in a park position to avoid interference with the viewing mode optical path. In the printing mode the first and second viewing mirrors 148 and 100 are out of the way of the viewing mode optical path, thus obviating the need for movably mounted viewing mirrors as in the aforementioned patent.

The scanning assembly 88 includes first and second rigidly mounted print mirrors 90 and 92 as well as a pivotally mounted third print mirror 94, carried by an irregular shaped bracket 156, disposed between a pair of oppositely disposed plates 157 and 159 as best shown in FIG. 7. The first print mirror 90 is carried by an integrally formed mirror mounting surface 156, disposed at an angle relative to a vertical axis 158. The second print mirror 92 is carried by an integrally formed mounting surface (not shown), disposed at an angle relative to a horizontal axis 162. The third print mirror 94 is pivotally mounted relative to the bracket 156. More specifically, the third print mirror 94 is carried in a cradle assembly 164 which includes an extending lever arm 166. The cradle assembly 164 is pivotally mounted to the plates 157 and 159 about an axis generally parallel to the vertical axis 158. Low friction bearings may be used to ensure relatively smooth rotation of the cradle assembly 164.

Figure 8:
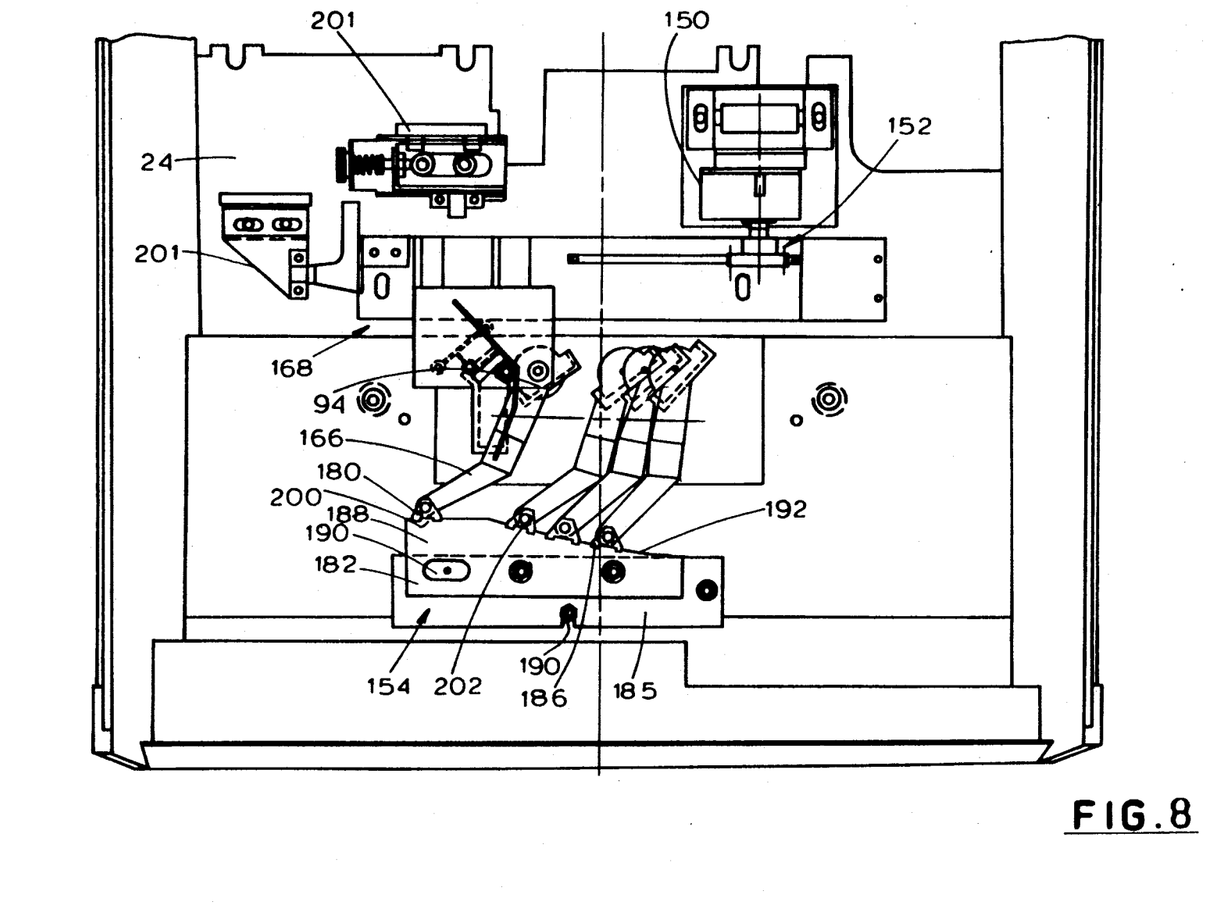
FIG. 8 is a partial plan view of the center section of the housing illustrating the scanning assembly in various positions in accordance with the present invention.

As shown best in FIG. 8, the scanning assembly 88 is rigidly mounted to a carrier assembly 168 slidably mounted relative to the transverse axis 63. More specifically, the carrier assembly 168 includes a carrier 169. The carrier 169 is slidably mounted relative to a stationary mounted rail 172 (FIG. 9). The rail 172 is, in turn, rigidly secured to the central section 26 of the housing 22. The carrier 169 is driven by the stepper motor 150 by way the rack and pinion assembly 152. The rack and pinion assembly 152 translates rotary motion of the stepper motor 150 into linear motion of the carrier 169. The rack and pinion assembly 152 includes a rack 174, rigidly secured to the carrier 169 and a pinion gear 176, rigidly secured to an output shaft 178 of the stepper motor 150. Accordingly, rotation of the stepper motor output shaft 178 causes the carrier 169 and the scanning assembly 88, rigidly mounted thereto, to move linearly about an axis generally parallel to the transverse axis 63.

Figure 10:
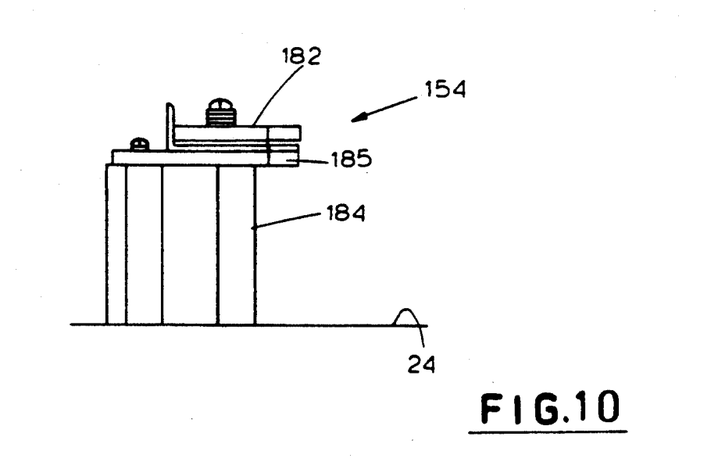
FIG. 10 is a partial elevational view of the cam bar assembly in accordance with the present invention.

As the scanning assembly 88 moves linearly relative to the transverse axis 63 as shown best in FIG. 8, the third print mirror 94 is rotated about the vertical axis 158 by way of the extending lever arm 166 having a pivotally mounted cam follower 180 and the cam bar assembly 154. The cam bar assembly 154 includes a cam bar 182 rigidly secured to the central section 26 of the housing 22 by way of a support 184 and plate 185 (FIG. 10). The support 184 as well as the plate 185 carry the cam bar 182 at the proper height relative to the vertical axis 158 to eliminate horizontal distortion of the scanned image. In addition, the cam follower 180 includes a pair of extending fingers 186 (FIG. 8) which track a top surface 188 of the cam bar 182 to enable the scanning assembly 88 to maintain a relatively exact parallel relationship with the objective lens 130 during scanning to ensure that the third print mirror 94 projects the image horizontally.

The cam follower 180 is biased downwardly to ensure that the cam follower 180 tracks the top surface 188 of the cam bar 182. More specifically, contacting surfaces of the extending fingers 186 on the cam follower 180 are dimensionally located a predetermined distance, for example, ten thousandths of an inch below the height of the top surface 188.

The support 184 also carries the cam bar 182 at the proper location relative to an x-plane (e.g. a plane parallel to the transverse axis) and the x-plane (e.g. a plane parallel to the longitudinal axis). Slots 190 may be provided in the cam bar 182 or the plate 185 to enable the position of the cam bar 182 relative to the plate 185 to be adjusted relative to the x and y planes.

The cam bar 182 includes a cam surface 192. The cam surface 192 is tracked by the cam follower 180 to maintain a constant track length (e.g. distance between the projected image and the photoconductive drum 40) during scanning. More specifically, the third print mirror 94 moves horizontally across the projected image during scanning while pivoting about its axis at the same time. This causes the angle of the projected image to change during the scan cycle. The projected image is directed to the exposure slot 39 above the photoconductive drum 40 during scanning. In order to maintain a constant track length, the cam surface 192 is formed as an arcuate surface having a predetermined radius.

This radius is calculated such that the track length is maintained constant throughout the scanning process and the speed of rotation of the third print mirror 94, which is proportional to the radius, matches the speed of the photoconductive drum 40. This ensures that the projected image will transfer to the paper in focus and not distorted horizontally in relation to the screen image.

Figure 11:
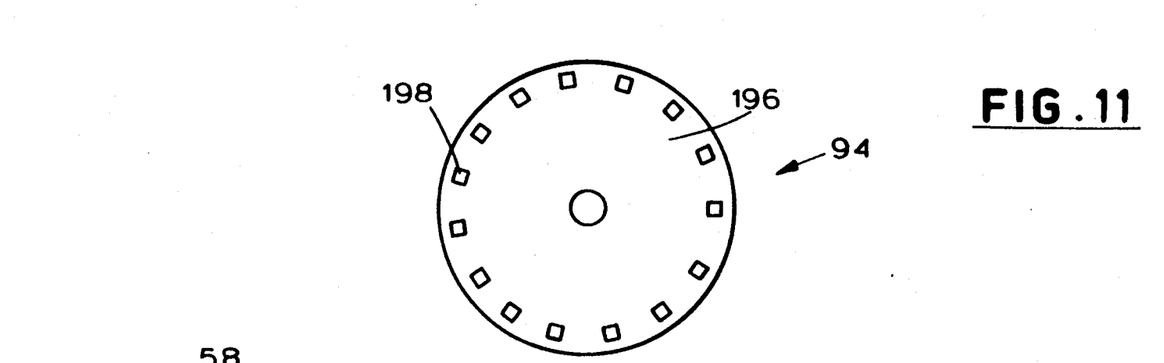
FIG. 11 is an elevational view of an encoder disc for sensing the speed of the print engine motor in accordance with the present invention.

Another important aspect of the invention relates to the fact that the scanning assembly 88 is mechanically independent from the photoconductive drum motor 40. In known reader printer apparatus, as previously mentioned, the scanning assembly is mechanically driven from the photoconductive drum motor 40. Since such motors are subject to wear, the speed of the scanning assembly will not be constant over the life of the motor which can result in recorded images that are out of focus. Moreover, gear runout in the engine drive mechanism is not the same on each print engine. Consequently, excessive runout over the life of the print engine can cause erratic movement of the scanning assembly, resulting in distorted images. The present invention solves this problem by providing optical coupling between the photoconductive drum motor 40 and the scanning mechanism 88. More specifically, as shown in FIG. 11, an encoder 194 is provided to sense the speed of the photoconductive drum motor 40. The encoder 194 is formed from a circular disc 196, which may be for example 1.112 inches in diameter. A plurality of holes 198 are evenly spaced around the circumference of the disc 196. The disc 196 is rigidly secured to an output shaft 197 (FIG. 9) of the photoconductive drum motor 40 and aligned with a light path and an optical sensor (not shown) rigidly mounted relative to the disc 196, to generate a pulse as each hole 198 is sensed as the drum motor 40 rotates. The assembly may be disposed in a housing 199, disposed adjacent the motor 40 as shown in FIG. 9. Since the disc 196 is rigidly secured to the output shaft 197 of the photoconductive drum motor 40, the rate at which pulses are generated is directly proportional to the speed of the motor 40. This pulse rate may be used to control the rate at which pulses are applied to the stepper motor 150 to control the speed of the scanning assembly 88.

The stepper motor 150 has two modes of operation—full step and half step. In the full step mode, the stepper motor shaft 178 rotates 8 degrees for every step while in the half step mode, the motor output shaft turns 0.9 degrees for every step. The full step mode is used for high speed movement of the scanning assembly 88 from a home or park position, identified in FIG. 8 with the reference numeral 200, to a start of scan position identified with the reference numeral 202. The half step mode is used only during scanning. After the scanning is complete, the stepper motor 150 is operated in reverse in the full step mode to the park position 200. As best shown in FIG. 8, a position sensor 201, such as an optical sensor, may be used to detect when the scanning assembly 88 is in the park position 200.

The linear velocity of the scanning assembly 88 is dependent upon the rate at which pulses are applied to the stepper motor 150 and the mode of operation. More specifically, during the scanning portion of the print cycle, the pulse rate or operating frequency of the stepper motor 150 is adjusted continuously to synchronize the scanning assembly 88 with the photoconductive drum 40. By controlling the pulse rate to the stepper motor 150, and as well as the mode, the speed of the scanning assembly 88 when traveling between a park position 200 and a start of scan position 202 can be controlled to be, for example, six times faster, than travel during scanning.

OPTICAL PATH

Figure 12:
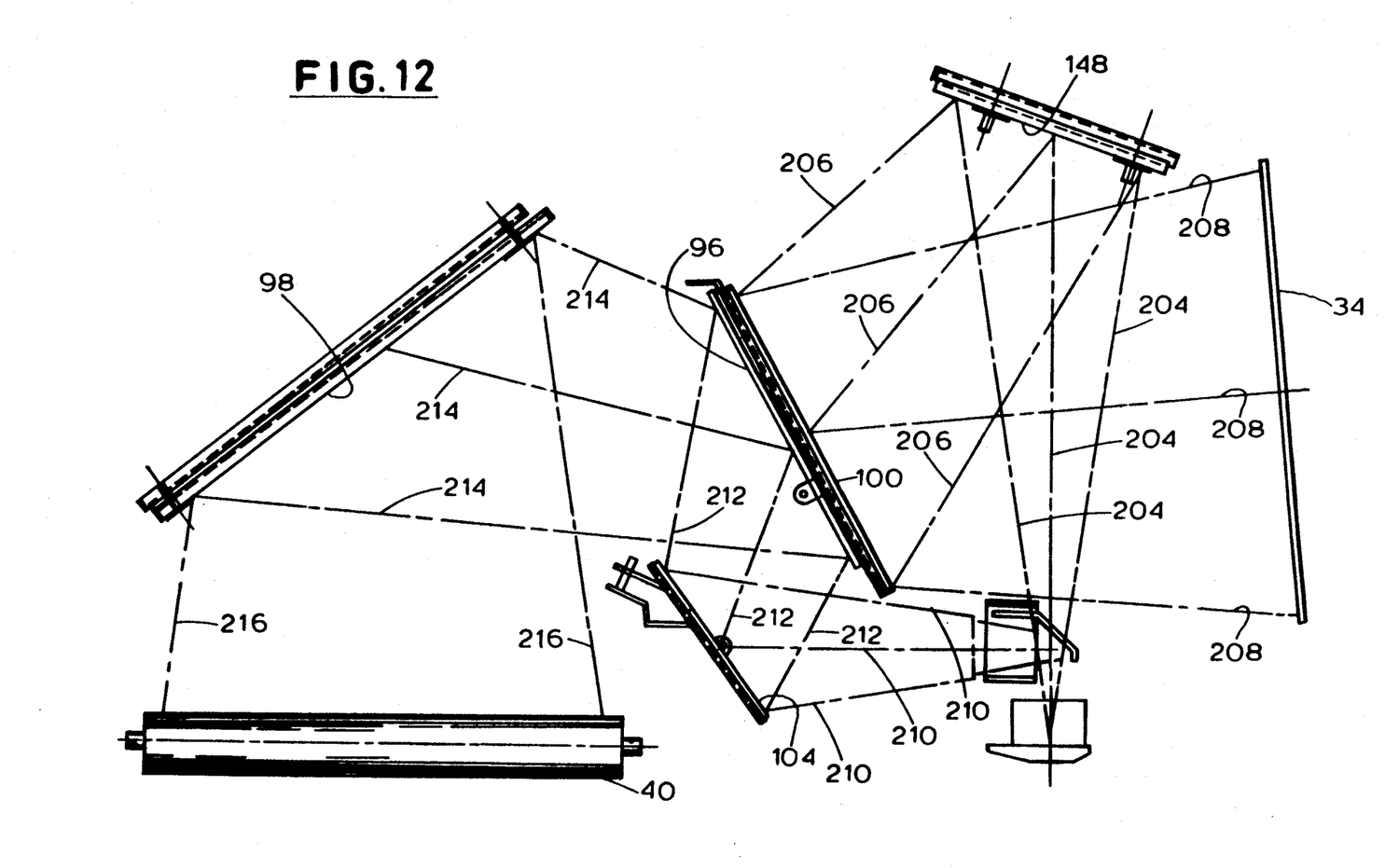
FIG. 12 is an optical diagram illustrating the optical paths for the viewing mode and the printing mode.

Another important aspect of the invention relates to the fact that the first and second viewing mirrors 148 and 100, respectively, do not interfere with the printing mode optical path and thus are mounted stationary. The optical paths for both the viewing mode and printing mode is shown in FIG. 12. During a viewing mode, a light path from the lamp 76 and the condensing lenses 78 and 80 is concentrated through the microfiche to an objective lens 130. The image is projected from the objective lens 130 to the first viewing mirror 148 along the optical path 204. The angle of the first viewing mirror 148 relative to the angle of the second viewing mirror 100 causes the image to be reflected to the second viewing mirror 100 along the optical path 206. The image is then projected onto the viewing screen 34 by way of the optical path 208.

Six printing mirrors 90, 92, 94, 96, 98 and 104 are utilized in the printing mode. As previously mentioned, the first, second and third printing mirrors 90, 92 and 94 are disposed within the scanning assembly 88. The printing mirrors 90, 92 and 94 scan consecutive portions of the image and project them to the fourth printing mirror 104 by way of the optical path 210. Due to the relative angles of the fourth printing mirror 100 and the fifth printing mirror 96, the image is them projected to the fifth printing mirror 98 along the optical path 212. Similarly, the image is projected to the sixth printing mirror 98 by way of the optical path 214. The image is then projected onto the print engine drum 40 through the slot 39 along the optical path 216.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

1. A reader printer apparatus for viewing or alternatively printing microimages recorded on microfiche and the like, comprising:
   a modular housing defining a base section, a center section and a top section having integrally molded component carrying means for carrying components;
   a viewing screen, carried by said housing;
   microfiche carrying means, carried by said housing, for carrying a microfiche;
   an objective lens for magnifying said microimage;
   means including a light source for projecting light through said microfiche to said objective lens; and
   a plurality of mirrors carried by said housing, adapted to project a microimage from said objective lens onto said viewing screen during a viewing mode or alternatively onto a print drum during a printing mode.

2. A reader printer apparatus as recited in claim 1, wherein said projecting means includes a lamp, one or more condensing lenses and a mirror mounted on a carrier forming a condensing optical assembly.

3. A reader printer apparatus as defined in claim 2, wherein said base section is formed with an opening for receiving said condensing optical assembly.

4. A reader printer apparatus as recited in claim 1, wherein said base section is formed with integrally molded rails for slidably carrying said microfiche carrying means along an axis generally parallel to a longitudinal axis.

5. A reader printer apparatus as recited in claim 1, wherein said component carrying means includes a plurality of supports with bosses to enable said print engine to be directly secured thereto.

6. A reader printer apparatus as recited in claim 1, wherein said housing is formed from a high impact styrene material.

7. A reader printer apparatus as recited in claim 1, wherein said base section is molded by a structural foam process.

8. A reader printer apparatus as recited in claim 1, wherein said center section is molded by a structural foam process.

9. A reader printer apparatus as recited in claim 1, wherein said top section is molded by a structural foam process.

10. A reader printer apparatus as recited in claim 1, wherein said base section is molded with a wall thickness greater than ¼ inch.

11. A reader printer apparatus as recited in claim 1, wherein said center section is molded with a wall thickness greater than ¼ inch.

12. A reader printer apparatus as recited in claim 1, wherein said top section is molded with a wall thickness greater than ¼ inch.

13. A reader printer apparatus as recited in claim 1, wherein said center section is formed with integrally molded side plates adapted to carry one or more printing mirrors and a viewing mirror.

14. A reader printer apparatus as recited in claim 1, wherein said plurality of printing mirrors includes one or more printing mirrors adapted to be movably mounted relative to said objective lens during a printing mode.

15. A reader printer apparatus as recited in claim 14, wherein said movably mounted printing mirrors are disposed adjacent said objective lens in a viewing mode.

16. A reader printer apparatus as recited in claim 1, further including means for rigidly mounting said viewing mirrors relative to said housing.

17. A reader printer apparatus as recited in claim 1, further including means for rigidly mounting said viewing mirrors and means for segregating said viewing mode and printing mode optical paths beyond said objective lens.

18. A housing for a reader printer apparatus comprising:
   an integrally molded base section;
   an integrally molded center section; and
   an integrally molded top section;
   wherein said base section, said center section and said top section are formed with means for carrying various components, which allows said components to be secured directly thereto.

19. A housing as recited in claim 18, wherein said base section, said center section and said top section are molded by structural foam molding.

20. A housing as recited in claim 18, wherein said base section, said center section and said top section are formed from high impact styrene.

21. A microfiche printer apparatus for printing microimages disposed on microfiche comprising:
   means for carrying microfiche;
   means for concentrating light through said microfiche;
   means including a print engine having a print drum for recording images projected onto said print drum, said print drum driven by a print motor at a predetermined speed;
   means for projecting said image from said microfiche to said print drum including a plurality of mirrors; said projecting means including means for scanning said microfiche and projecting consecutive sections of an image disposed on said microfiche to said print drum; and
   means for synchronizing scanning means with said print motor, said synchronizing means mechanically uncoupled from said print motor.

22. A microfiche printer apparatus as recited in claim 21, wherein said scanning means includes a first mirror, a second mirror and a third mirror carried by a bracket, said first mirror and said second mirror rigidly mounted to said bracket and said third mirror pivotally mounted relative to said bracket forming a scanning assembly.

23. A microfiche printer apparatus as recited in claim 22, further including means for carrying said bracket and allowing linear movement of said scanning assembly relative to said microfiche.

24. A microfiche printer apparats as recited in claim 23, further including means for driving said carrying means.

25. A microfiche printer apparatus as recited in claim 24, wherein said driving means includes a stepper motor and a rack and pinion gear assembly.

26. A microfiche printer apparatus as recited in claim 25, further including means for controlling said stepper motor.

27. A microfiche printer apparatus as recited in claim 26, wherein said controlling means includes means for sensing the speed of said print motor.

28. A microfiche printer apparatus as recited in claim 27, wherein said sensing means includes means for optically sensing the speed of said print motor.

29. A microfiche printer apparatus as recited in claim 28, wherein said optically sensing means includes a disc with a plurality of holes adapted to be rigidly mounted to an output shaft of said print motor.

* * * * *